(12) United States Patent
Rrahimi et al.

(10) Patent No.: US 10,723,145 B2
(45) Date of Patent: Jul. 28, 2020

(54) HARDENING CHAMBER FOR PRINTED MATTER

(71) Applicant: HAPA AG, Volketswil (CH)

(72) Inventors: Migjen Rrahimi, Wetzikon (CH); Nicole Howald, Jona (CH); Matthias Theiler, Dübendorf (CH); Marcel Holdener, Gossau ZH (CH); Stefan Braun, Mönchaltorf (CH); René Colombo, Freienbach (CH); Sascha Simon, Römerswil (CH)

(73) Assignee: HAPA AG, Volketswil (CH)

( * ) Notice: Subject to any disclaimer, the term of this patent is extended or adjusted under 35 U.S.C. 154(b) by 0 days.

(21) Appl. No.: 16/283,709

(22) Filed: Feb. 22, 2019

(65) Prior Publication Data

US 2019/0263145 A1 Aug. 29, 2019

(30) Foreign Application Priority Data

Feb. 23, 2018 (CH) ........................................ 0223/18

(51) Int. Cl.
*B41J 29/377* (2006.01)
*B41F 23/04* (2006.01)
(Continued)

(52) U.S. Cl.
CPC .......... *B41J 11/002* (2013.01); *B41F 23/0409* (2013.01); *B41F 23/0483* (2013.01);
(Continued)

(58) Field of Classification Search
CPC .... B41J 11/002; B41J 29/377; B41F 23/0409; B41F 23/0483; C09D 11/38; C09D 11/101; C09D 11/107; B41M 7/0081
See application file for complete search history.

(56) References Cited

U.S. PATENT DOCUMENTS

| 6,469,785 | B1 * | 10/2002 | Duveneck | ............ | G01N 21/648 356/244 |
| 8,102,530 | B2 * | 1/2012 | Sperling | ................... | G01J 3/02 356/402 |

(Continued)

FOREIGN PATENT DOCUMENTS

| DE | 10141755 A1 | 3/2002 |
| EP | 3168861 A1 | 5/2017 |

(Continued)

*Primary Examiner* — Anh T Vo
(74) *Attorney, Agent, or Firm* — Procopio, Cory, Hargreaves & Savitch LLP

(57) ABSTRACT

A curing chamber for curing and drying a flat printing product printed with at least one UV-curing pigment comprising a first chamber wall which comprises a cooling surface or is a cooling surface, a second chamber wall which is opposite the first chamber wall, wherein at least one UV lamp directed onto the cooling surface is arranged on or in the second chamber wall, third and fourth chamber walls which are arranged opposite one another between the first and the second chamber walls and which each comprise an introductory slot or removal slot and/or form an appropriate slot to the first chamber wall, fifth and sixth side walls arranged opposite one another and arranged between the first and the second chamber walls, wherein a gas inlet or a gas outlet is arranged in the vicinity of the third and fourth chamber walls, and the gas inlet is an inert gas inlet.

29 Claims, 4 Drawing Sheets

(51) Int. Cl.
  *C09D 11/101*    (2014.01)
  *B41J 11/00*     (2006.01)
  *B41M 7/00*      (2006.01)
  *C09D 11/107*    (2014.01)
  *C09D 11/38*     (2014.01)

(52) U.S. Cl.
  CPC .......... *B41J 29/377* (2013.01); *B41M 7/0081* (2013.01); *C09D 11/101* (2013.01); *C09D 11/107* (2013.01); *C09D 11/38* (2013.01)

(56) References Cited

U.S. PATENT DOCUMENTS

2005/0052648 A1* 3/2005 Frick .................. G01J 1/06
                                                356/328
2014/0014857 A1   1/2014 Martinez et al.

FOREIGN PATENT DOCUMENTS

| WO | 9634700 A1    | 11/1996 |
| WO | 2011122257 A1 | 10/2011 |

\* cited by examiner and  chamber.

HARDENING CHAMBER FOR PRINTED MATTER

CROSS-REFERENCE TO RELATED APPLICATIONS

This application claims priority to Switzerland Patent Application No. 00223/18, filed Feb. 23, 2018, the contents of which are incorporated by reference.

The invention relates to a curing chamber for curing and drying a flat printing product according to Claim 1 printed with at least one UV-curing pigment and to a printer according to Claim 12, comprising a curing chamber according to Claim 1. Furthermore, the invention comprises a method for printing a printed sheet and curing the printing product according to Claim 20 with an appropriate curing chamber.

TECHNICAL BACKGROUND

Printers for continuous printed sheets which are printed with UV ink and subsequently hardened are known in the prior art. The term UV ink denotes in the following an ink which can be polymerized, that is, hardened under the influence of UV rays. The surface of the printed sheet also becomes dry and touchable at the same time as the curing of the ink. The printed sheets can be supplied to the printer as individual printing sheets or as so-called endless printing webs from a roll. The ready, printed sheet, i.e. the printing product, can be subsequently further processed, stacked or, in the case of endless printing webs, wound up again, for example, on a receiving roll. The curing, which is used here synonymously with a thorough curing or thorough polymerization, takes place immediately after the printing in order to prevent a smearing during the further processing or a so-called transfer of the printed front side onto the non-printed back side of the printed product during the stacking or rolling up of the latter. To this end, the freshly printed printing product is irradiated with a UV lamp. In order to ensure the UV curing in continuous systems in the required short time, correspondingly high UV irradiation performances are necessary which also thermally stress the printing product. The thermal stress by the strong, long-wave range of traditional UV irradiators could be reduced by using LED-UV irradiators and air cooling of the surface of the irradiated printing product; however, this is too high a load, e.g., for thin and/or thermally sensitive plastic sheets which can result in distortion, formation of folds or even a melting or catching fire of the printed sheet. The situation is additionally intensified by the exothermal reaction enthalpy released during the polymerization of acrylate inks.

The present invention has the goal, among other things, of eliminating the above-described disadvantages of the prior art and to make available a method and a curing chamber and a printer operated with a corresponding curing chamber with which even then plastic substrates, in particular plastic sheets, e.g., of polyethylene (PE) or polyvinyl chloride (PVC) are printed with UV ink and can be hardened in continuous systems even at high through speeds.

Disclosure and Embodiments

A curing chamber according to the invention for curing and drying a flat printing product printed with at least one UV-curing pigment comprises
  a first chamber wall which comprises a cooling surface or is a cooling surface,
  a second chamber wall which is opposite the first chamber wall, wherein at least one UV lamp directed onto the cooling surface is arranged on or in the second chamber wall,
  third and fourth chamber walls which are arranged opposite one another between the fi and the second chamber walls and which each comprise an introductory slot or removal slot for introducing or removing the printing product and/or form an appropriate slot to the first chamber wall,
  fifth and sixth side walls arranged opposite one another between the first and the second chamber walls.

A gas inlet or a gas outlet is arranged on or in the immediate vicinity of the third and fourth chamber walls, wherein the gas inlet is an inert gas inlet. Furthermore, the gas inlet can be a cooling gas inlet in as far as the temperature of the gas is lower than the temperature of the irradiated surface. Therefore, the inert gas supply can not only accelerate the curing of the UV-curing ink on the surface of the printing product but can additionally cool the printed front side of the printing product which side faces away from the cooling surface.

Basically, Ar or also Ne, He, Xe or $CO_2$ can be used here; however, especially good results regarding the drying power were surprisingly achieved with nitrogen. The inert gas supply can therefore comprise a supply of Ar or also Ne, He, Xe or of $CO_2$ but can in particular comprise a supply of nitrogen or can be an appropriate gas supply. This can also comprise, e.g., at least one compressed gas container with an appropriate gas supply, e.g., Ar and/or nitrogen. The cooling surface serves here for cooling a first area of a first side (back side) of the flat, substantially two-dimensional printing product, whereas the UV lamp serves to irradiate a second area on the second side (front side) of the printing product, wherein the first area and the second area overlap at least partially as regards their x, y projections in the plane of the printing product so that the projection of the first area comprises the second area. The printing product therefore lies at least in the irradiated area on the cooling surface and is guided in a contacting manner on the cooling surface. The curing chamber is therefore constructed as a chamber over the first side of the printing product, at least over the area which is irradiated and cooled on the back side.

The cooling gas inlet, like the gas outlet, can be placed on or in the vicinity of a chamber boundary which is opposed to a direction of transport of the printing product. For example, the inlet on the front 3d chamber wall as regards the direction of transport T, and the outlet on the rear $4^{th}$ chamber wall regarding the direction of transport T or vice versa. The flow of inert gas can be conducted to the transport device in the same direction if the cooling gas inlet is provided, e.g., on or in the vicinity of the inlet side of the chamber of the printing product or opposite to the direction of transport if the inert gas inlet is provided, e.g., on or in the vicinity of the output side of the printing product. The gas outlet is then at or in the vicinity of the particular opposite inlet side/outlet side. In one embodiment the cooling gas inlet is placed in the vicinity of or on the 3d chamber wall which is in front as regards the direction of transport T of the printing product and the gas outlet on the corresponding rear fourth chamber wall.

The cooling surface can be the surface of a cooling roller which can rotate at least in the transport direction. The cooling roller can either be rotated by the printing product resting on the cooling surface, i.e., on a partial area of the roller circumference, or be provided with a drive which moves the cooling surface at the same (circumferential)

speed as the printing product guided along it. The drive can take place via a central drive, e.g., of a printing system connected to the curing chamber by transmission belts or transmissions or take place via a separate one which can be synchronized, e.g., to a set through speed of the printer.

The cooling gas inlet can comprise at least one flat jet or an appropriate linear jet arrangement with an alignment to the transport plane which is parallel to the longitudinal dimension of the jet opening or jet arrangement, and with an outlet plane IG of the cooling gas which is parallel to or at an acute angle to the transport plane, in particular to the cooling surface. The term outlet plane denotes here the (main) outlet plane of the cooling gas exiting in a planar manner out of the jet. In order to achieve an appropriate guidance of the cooling gas flow, the jet itself or a flow body arranged directly in front of the jet opening as regards a cooling gas flow and connected to the latter is constructed, e.g., at first parallel to and/or tapering in the last section toward the jet opening. Therefore, the jet or the flow body with the jet can be directed regarding the outlet plane parallel to or at an acute angle to the cooling surface, in particular parallel to or at an acute angle in or alternatively against the direction of transport. Therefore, even the cooling gas flow or inert gas flow is directed parallel to or at an acute angle to the cooling surface or the direction of transport. Such a cooling gas inlet can be designed especially effectively in the shape of a so-called air knife, also called an air blade, air knife or air sword as a precision-manufactured air jet, e.g., of aluminum or high-grade steel with which a uniform, sharp air curtain can be formed which is ideal for drying and cooling purposes. The angle of the outlet plane IG can be between 30 and 60°, e.g., between 40 to 50°. In addition, the outlet opening(s) or jet(s) can be designed, e.g., by a recess in a gas inlet wall below one and/or directly in front of and/or directly behind a third or fourth chamber in such a manner that even vortices counter to the transport direction T are also formed. Alternatively, a jet or row of jets can be directed in the transport direction T and a second jet row at a corresponding acute angle, e.g. as further above, counter to the transport direction T. Both measures can reduce even more the undesired penetration of air and air oxygen. Given an appropriate selection of parameters, e.g. producing a slight excess pressure in the curing chamber, additional slot seals can be eliminated, in particular when providing one of the above-cited measures. The UV lamp can emit light in a range between 200 nm and 450 nm or between 365 nm and 405 nm and/or be arranged parallel to the cooling surface, for example in a circular shape or a segmented circular shape at a distance of 15 mm to 50 mm, or from 20 mm to 40 mm. The LED lamp can be designed to be curved regarding its irradiation surface parallel to the cooling roller, e.g. as a small-area, segmented array. The curing chamber can comprise two or more UV lamps which are arranged offset regarding the transport direction and/or laterally from each other. The UV lamp can be an LED lamp or an LED array.

The curing chamber can be constructed in such a manner that the jet itself or a flow body connected to the jet forms the third or the fourth chamber wall and/or the fourth or the third chamber wall comprises a gas outlet with a smaller or equally large free gas outlet surface like the gas inlet surface of the at least one jet. The fourth of the third chamber wall can basically be designed at least in partial areas as a perforated wall, i.e., a wall with holes or with grids. Alternatively, or in a supplementary manner, the inlet slot and/or the outlet slot can also form the gas outlet by itself, together or in combination with other gas outlet surfaces, e.g., lateral slots.

The curing chamber can comprise means for pressing the printing product on the cooling surface and/or means for guiding the printing product on the cooling surface. Such means can also be provided alternatively or additionally outside of the curing chamber in the associated printer. The dimensions of the irradiated cooling surface can basically be selected regarding the width to be the width of the web to be printed, e.g., in a range from 100 to 2000 mm or 150 to 400 mm. As regards the irradiated area of the cooling surface in the transport direction of the continuous printing product, a length of at least 2 to 50 cm, in particular also a length of 5 to 20 cm proved to be advantageous.

The invention also comprises a printer with at least one printing device for applying a UV-curing ink on a printing web with at least one UV ink storage or a UV ink supply, wherein the printer comprises a curing chamber as described in detail above and in the exemplary embodiments, which is arranged in the transport direction T downstream from the printing device.

The printer can comprise means for pressing the printing product on the cooling surface and/or means for guiding the printing product on the cooling surface.

The pressing means, which are arranged on the printer either on or in the curing chamber downstream from the curing stretch or also, e.g., after the curing chamber, can comprise at least one spring-suspended roller or a torque-controlled drive. The guiding can take place here, e.g., by a web edge control via the axial angle of a drive roller.

The printing device can comprise at least one inkjet printing head, in particular two, three, four or more inkjet printing heads, wherein a fixing station can be provided between at least two printing heads. Such fixing stations, also called pinning station, can be used for a color-on-color and/or a white print in order to avoid that the colors run into each other and to achieve a sharp delineation. In addition, UV fixing lamps, in particular UV-LED fixing lamps can be advantageously used, which can be operated at considerably lower powers than the UV lamps used in the curing chamber since here only a single and therefore thin color layer has to be hardened and a grip-resistant curing is not yet necessary at this position.

An endless printer according to the invention can comprise a storage roller for receiving a printing web and/or can comprise a receiving roller for receiving the printing product, i.e., the printed web which is printed and also hardened there.

Alternatively, the printer can also be designed as a module of an in-line printing system with a continuous printed web.

The present invention also comprises a method for printing a printed web wherein the printed web is printed at first in the printing device with a UV-curing ink, e.g., an inkjet ink, and is subsequently hardened in a curing chamber in accordance with the invention as described above, or in the printer according to the invention as described above in the curing chamber under an inert gas. The printer result is also cooled here by the flow of the inert gas and is more rapidly dried in comparison to an air cooling in order to securely prevent the generation of a splash or in the hearing of the printed web(s), e.g., on a receiving roller.

Ar or also Ne, He, Xe or CO2, but in particular nitrogen can be used as inert gas. The method can be an endless printing method in which the printing product prints A's at a through speed of 5 to 300 m/min or 7 to 60 m/min and is hardened. Whereas the lower limit applies to an in-line application of a printer coupled, e.g., to a deep-drawing machine, it must be operated adapted to the low speed of such machines. On the other hand, the upper limits concern performance printers and extremely high-performance printers.

A performance of 1 to 40 W/cm², or between 2 to 20 W/cm² can be introduced onto the surface of the printing product guided onto or on the cooling surface.

The printed web can comprise a sheet or an endless sheet or be a sheet or an endless sheet, wherein the sheet can be a plastic sheet a paper-based sheet, a label sheet or an aluminum sheet. For example, a plastic sheet of PVC, PP (polypropylene) or polyethylene, in particular PP-HD or PE-HD (e.g., Tyvek® from Dupont, a fleece material consisting of high-density polyethylene, i.e., PE-HD which is produced from fibrillated, extremely fine filaments connected tightly to each other to networks formed in a diameter range of 0.5 to 10 μm) can be produced.

Even thin sheets with a thickness of 0.5 μm to 600 μm, in particular between 10 μm to 300 μm can be printed. A sufficient cross-linking, that is, curing of the UV inks on such thin sheets, in particular plastic sheets of PE, is only possible based on the low irradiation energies of the present method without thermally damaging the sheet. The cooling can take place additionally at least in the irradiated area by guiding the back side of the printing product on or over a cooling surface.

The printing of the sheet takes place with a UV-curing ink. This ink can be produced on an acrylate basis. For example, the ink can comprise pigment(s) and/or clear lacquer, radical photoinitiators, dispersants and optionally other additives. At least two radical photoinitiators of the Norrish type 1 and at least one radically hardenable monomer in the form of a polyfunctional alcoxylated and/or polyalcoxylated acrylate monomer comprising one or more di- and/or triacrylates can be contained, wherein the molar ratio of all acrylates to all initiators is about 5:1 to 19:1, especially about 7:1 to 15:1. Refer otherwise to WO 2011/135089 A1 regarding other details of the ink recipes used here, which is declared as an integral part of the invention to its full extent regarding the inks used here. Note in addition that even appropriate UV-curing inks with an adhesion promotor in the form of an isocyanate in a concentration of 0.1 wt % to 20 wt % or 0.5 wt % to 2.5 wt % can be used for the printing. For example, various adhesion promotors are named in the following which are suitable for being used with UV inks in general and for being used with a curing chamber according to the invention in particular:

A 50% solution of poly(toluene-2,4-diisocyanates) in butyl acetate, with the formula for the monomers:

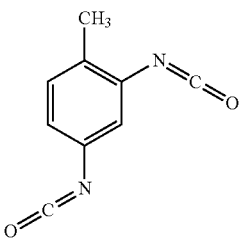

Hexamethylene diisocyanates with CAS number 822-06-0

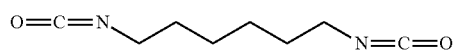

Poly(hexamethylene-diisocyanates) with CAS number 28182-81-2

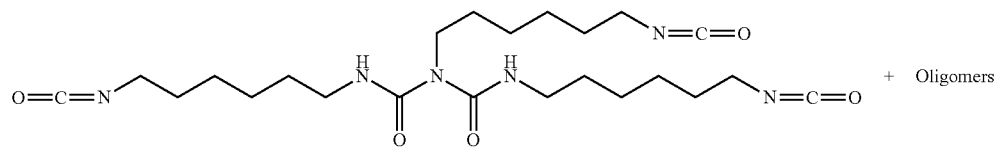 [SMILES: O=C=NCCCCCCNC(=O)N(CCCCCCN=C=O)C(=O)NCCCCCCN=C=O]

Poly(propylene-glycol) with toluene-2,4-diisocyanate terminal group with CAS number 9057-91-4

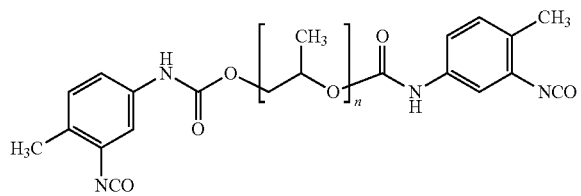

DESCRIPTION OF THE FIGURES

The invention is described in the following by way of example using figures. The same reference numbers in different figures have the same meaning. All drawings are schematic and cannot serve for a direct derivation of relationships of magnitudes or of dimensions.

Figure 1:
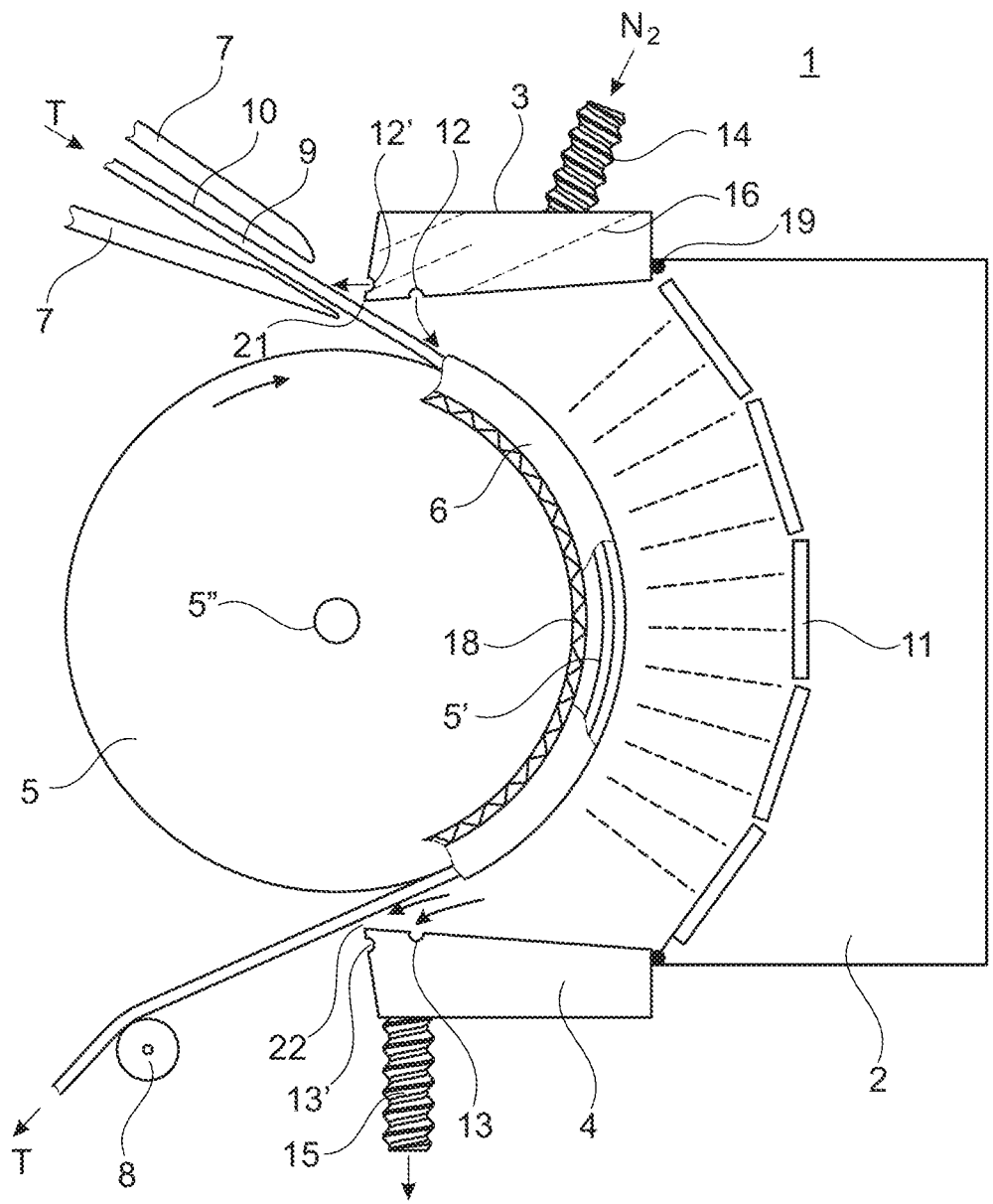
FIG. 1 A curing chamber according to the invention
FIG. 2 Another curing chamber according to the invention
FIG. 3 A printer with a curing chamber
FIG. 4 Course of polymerization with/without inert gas The embodiment of a curing chamber according to the invention shown in FIG. 1 comprises a cooling roller 5' which substantially forms the first "lower" chamber wall at the same time. In the following, like the concept "below" already previously used inside the curing chamber regarding an area extending from the plane of the printing product 9 in the direction of the cooling surface 5 or of the first chamber wall, the concept "above" concerns an area extending from the plane of the printing product in the direction of the UV lamps 11, 11' and of the second chamber wall 2. A diode array 11 which is formed substantially in a (partially) circular manner in parallel above the cooling roller and composed of five segments is located in the second, opposing upper chamber wall 2, which array irradiates onto the printed surface 10 of the printing product 9 resting on the cooling surface of a cooling roller 5' which is, e.g., water-cooled. The printing product 9 is guided or entrained from or on the cooling roller 5' rotating in the transport direction about the axis 5" (according to the arrow T on the ends of the printed product which are cut off for the sake of the representation. Laterally limiting surfaces 6, e.g., of the sidewalls corresponding to a fifth and a sixth chamber wall, shown here only in a smaller partial area of the drum circumference as is necessary for the sealing of the chamber can be sealed against the rotating roller 5' by a dynamic seal 18, e.g., a labyrinth seal or brushes. The side surfaces 6 can be attached on the third and fourth lateral chamber walls, which are not shown in detail here, or can be components of the corresponding sidewalls. Additional upper and lower surfaces 7 can facilitate the entrance of the printed product into the introductory slot 21 of the curing chamber 1. The contact pressure of the printed product, e.g., of the sheet or of a label sheet on the cooling surface 5 can be increased by adjustment means which are not shown here for the roller 5'. In addition, several contact pressure rollers or contact pressure cylinders 8 which are elastically positioned against the printed surface 9 of the exiting print web are provided as contact pressure means. The latter as well as upper and lower guide surfaces can be mounted either directly on the chamber 1, 1' or separately on the associated printer 23.

The third chamber wall, which is the front one regarding the transport direction T, is formed here by the inert gas inlet 3 which conducts the inert gas, especially cooling gas, e.g. nitrogen, flowing in through the gas line 14 by flow conduction means such as flow conduction sheets 16, 16' in the inlet 3, 3' and/or by the geometry of the jets 12 at an acute angle or parallel to the surface 9 of the printing product. The direction of flow of the cooling gas can form a so-called cooling gas curtain with a cooling plane or inert gas plane IG (vertical to the viewing plane) parallel to or an at acute angle to the transport plane or the cooling surface. Gas inlet 3 comprises two longitudinal jets 12, 12' or jet rows 12, 12' which are arranged in an appropriate linear manner with different flow directions and inlet lines according to the arrows. The first jet or jet row 12 produces a flow curtain directed in the transport plane in the chamber 1. On the other hand, the second jet or jet row 12' produces outside of the chamber 1 a flow curtain directed counter to the transport direction, which reduces the oxygen component already before the introductory slot 3 and therefore inflowing leakage gas has a lesser oxygen content already between the sheet and the third chamber wall or inlet 3.

The fourth chamber wall, the rear one regarding the transport direction T, is formed here by the gas outlet 4 through which the blown-in inert gas is removed by suction and conducted into the gas removal line 15. As FIG. 1 shows, the outlet 4 can also comprises two outlet openings 13, 13', in particular outlet slots or opening rows arranged in an appropriate linear manner of which the one 13 is arranged in the chamber and the other one 13' is arranged outside of the chamber, here in the direct vicinity of the discharge slot 22. This can prevent an undesired inflow of air through the discharge slot 22 on the one hand by the inert gas flowing with an excess pressure out of the chamber and the additional outer chamber suction removal 13', and on the other hand also without additional seals. A static seal 19 can also be attached between gas outlet 4, 4' or the fourth chamber wall and the second chamber wall 2 such as between gas inlet 3, 3' or the third chamber wall 3" and the second chamber wall 2 as well as between all other elements forming a partial area of a chamber wall. Furthermore, an oxygen sensor 17 can be arranged in the chamber 1, 1' in order, e.g., to display a too high concentration of oxygen, e.g., in order to turn off the printer or to elevate the influence of gas by a process control.

Figure 2:
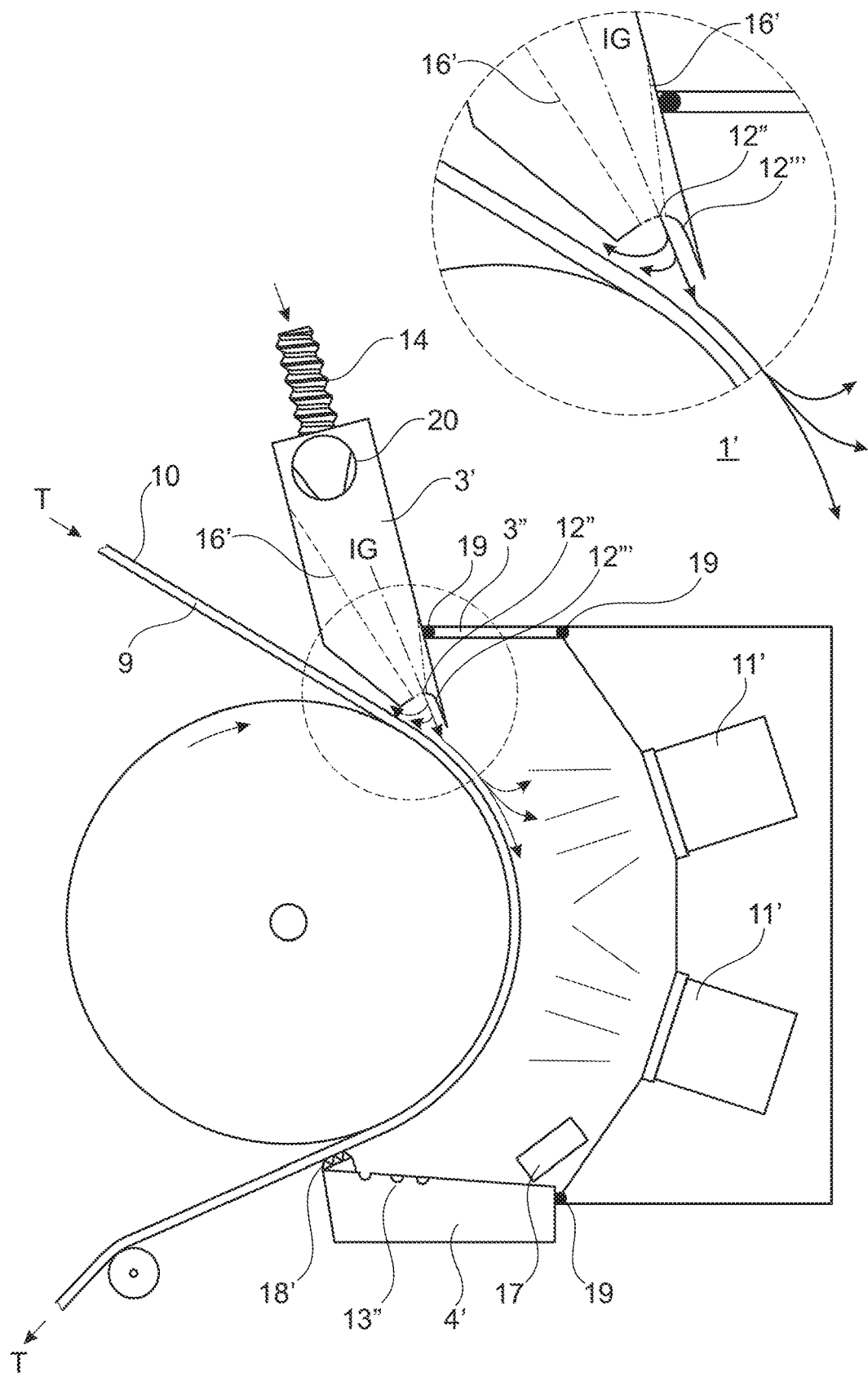

The curing chamber 1' shown in FIG. 2 is constructed similarly to the one shown in FIG. 2; however, a cooling gas inlet is constructed here as a so-called air sword with a compressor 20 which comprises only a longitudinal jet or jet arrangement 12" which generates an air curtain symbolized by an arrow in the inert gas plane IG represented by dotted lines which curtain is deflected by the printing product resting on the cooling surface in the transport direction T and is spun more in the chamber, as is indicated by 3 arrows. An inert gas turbulence shown by two arrows counter to the transport direction T and formed by a concave inlet surface 12''' formed after the jet 12" in or on the 3d chamber wall is simultaneously formed which additionally prevents the penetration of air into the curing chamber. In distinction to the embodiment shown in FIG. 1, two individual LED irradiators are shown which are arranged in series relative to the transport direction T. Furthermore, the cooling gas is removed by suction here only by outlet openings 13" directed into the chamber 1', wherein the discharge slot 22' is sealed by a brush 19' against atmosphere.

Figure 3:
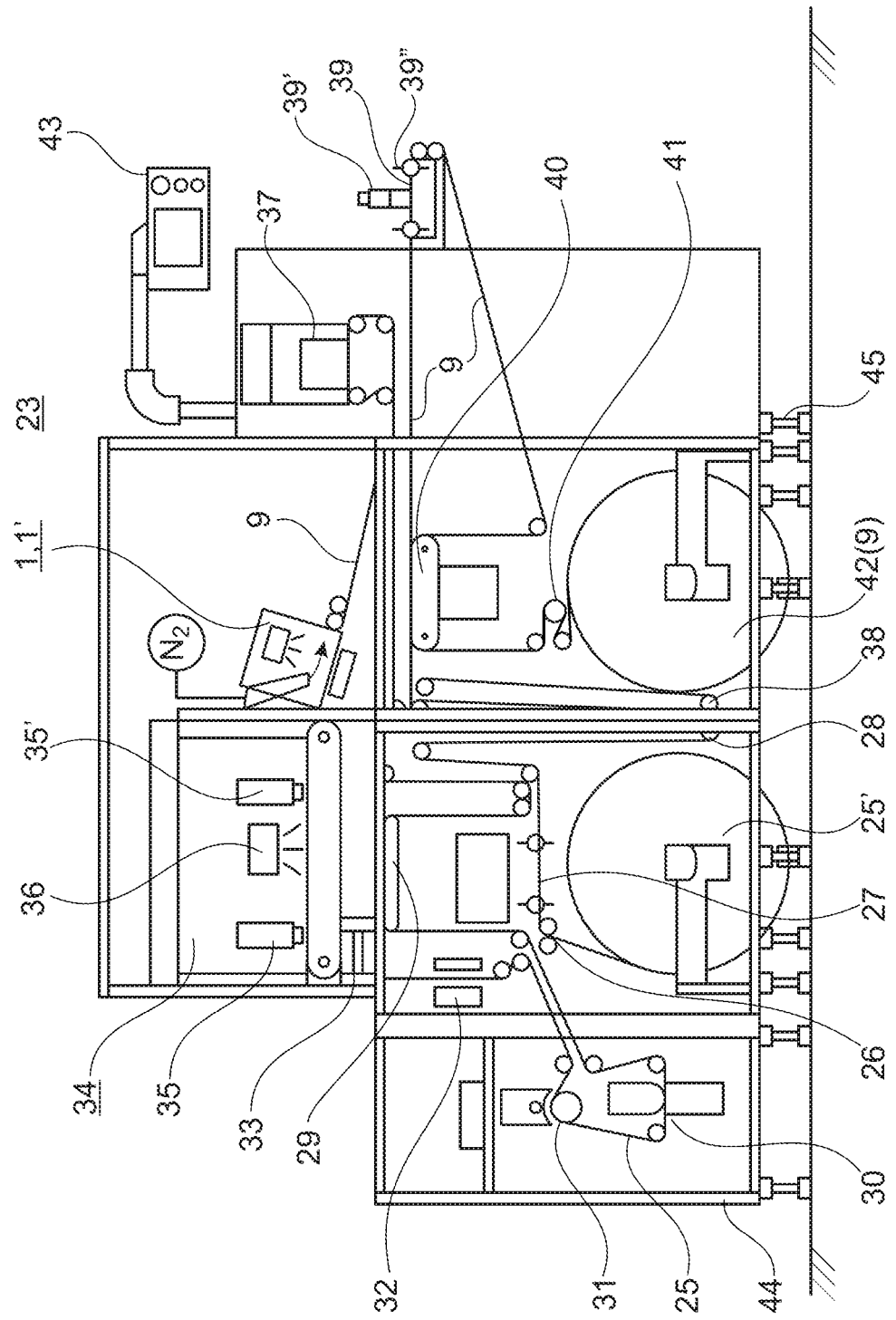

FIG. 3 shows by way of example in a greatly simplified manner a universally useable UV-DOD (drop on demand) label printer 23 with a curing chamber 1, 1' according to the invention which is mounted in a frame 44 supported on leveling feet 45 on which the input/output unit 43 for the operator is also located. Therefore, printing web rolls 25' to 600 mm in diameter can be processed.

The individual components of the printer 23, which are already known in part from the prior art, are described in the following substantially along a partially optional flow path of the printing web 25 (web) or of the printing product 9, i.e. of the printed printing web. The printing web 25 is drawn from the printing web roll 25' by the or via the inlet-side printing web guide 29 at first past the station 26 for measuring the thickness of the printing web via the input splicing table 27 and the input-side dancer rollers 28. The measuring of the layer thickness for the automatic cutting off of an erroneous printing web, e.g., for determining any folds, bubbles or wrinkles on the labels can take place by deflection or pressure on two oppositely positioned rollers. The printing web guide 29, on which a measuring device which is not shown in detail for the detection of the webpage can also be provided, is followed by three optional modules: a cleaning station 30 for the cleaning, e.g., by a counter-roller with an adhesive surface, a corona station 31 for pretreating the printing web 25 with a corona discharge, and a printing web heating 32 whose temperature can be adjusted by the input/output unit 43. A label image sensor and/or printing position sensor 34 is located directly in front of the printing device 33 in order to make possible the most exact printer result. This can take place, e.g., by a 4-point measuring of a preprinted position or the like.

The printing device 34 comprises four to ten printing heads with different colors, wherein 1 to 10 printing heads can be used per color, wherein UV inkjet printing heads 35, 35' for only two colors with a fixing station 36 arranged between them are shown by way of example. The fixing station can be provided between two printing heads or between two printing head rows with a different color in order to make possible printing the colors over even at high printing speeds without them running into each other (bleeding). Even an arrangement between the printing station or the last printing head or the last printing head row and the curing chamber is possible to achieve a temporary fixing, e.g., in order to fix the uppermost color layer. Such a printing device usually comprises, in as far as it is intended to be universally used, printing heads for the colors white, CMYK, full colors, transparent lacquer and the corresponding fixing stations between them. The fixing station 36 can also harden the ink printed by the first printing head by a UV lamp but is operated in this case at a lower W/cm² performance than the UV lamp(s) of the following curing station according to the invention. The curing station can be constructed, for example, with a plane cooling surface or analogously to the curing chambers 1, 1' shown in FIGS. 1 and 2 with a cooling roller or from an appropriate mixture of different feature combinations according to the invention.

Subsequently, an optional control system 37 for the automatic testing of the print quality can also be provided in front of the output dancer rollers 38 and/or in front of an output-side splicing table 29 which comprises, analogously to the input-side splicing table 27, two printing web holders 39'' and an adhesive roller holder 39'. After having run through the printing product guide 40, the printing product 9 runs over a traction control 41 in order to properly adjust and control the traction tension present on the printing product before the printed web is wound up on the printing product roll 42.

Figure 4:
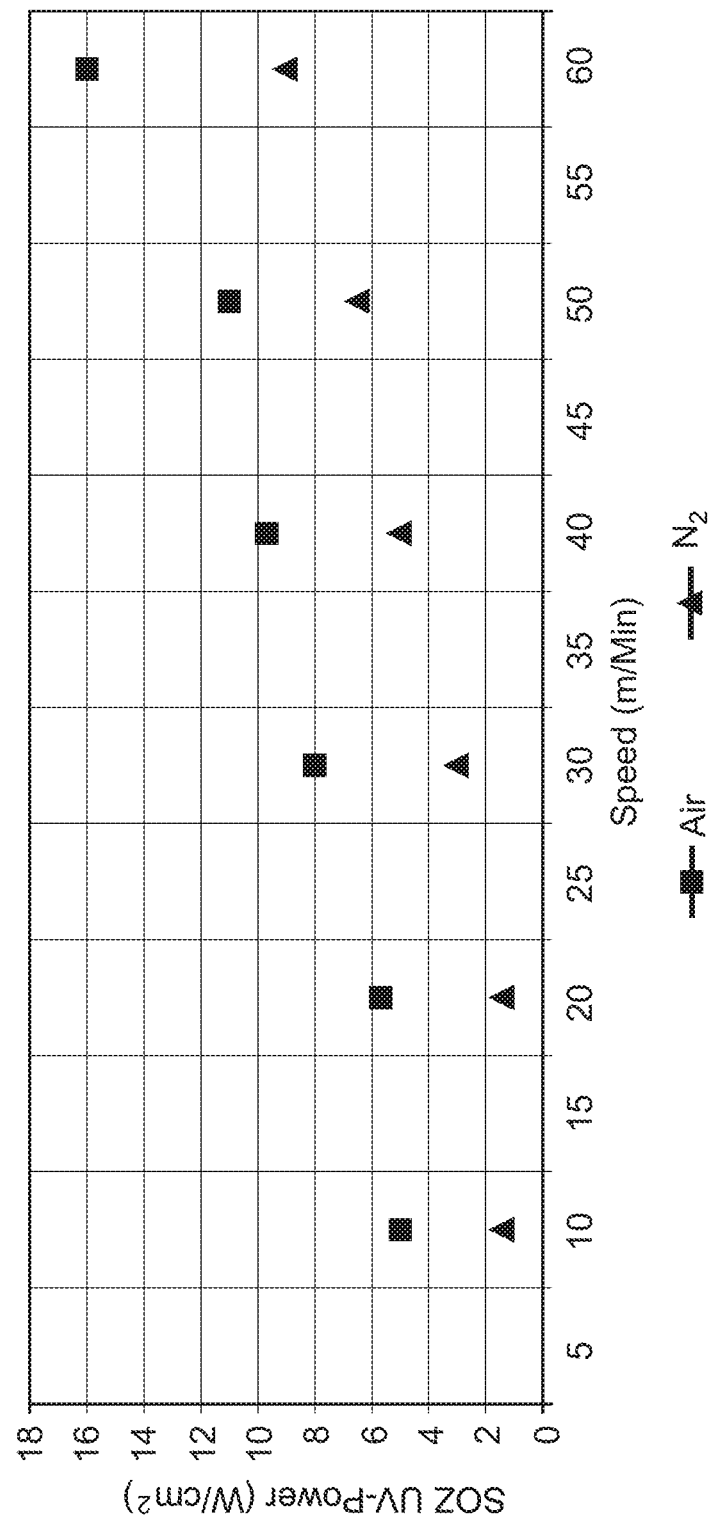

FIG. 4 shows results of a comparison test of a curing chamber according to the invention which is operated with nitrogen and the results from a conventional operation with compressed air. The so-called SOZ (safe operating zone) performance of the UV lamps per cm² of the irradiated surface was determined (y axis) at different run-through speeds (x axis) in which a reliable thorough curing was able to be determined after a passage of an irradiated, cylindrical plane with a length of, for example, 8 to 20 cm. The corresponding numerical values are listed in table 1. The SOZ performance corresponds to the performance which brings about such a thorough curing (complete polymerization) at the corresponding speed and which prevents the production of splashing, e.g., on the back side of a rolled-up sheet. It is clear here that for the curing under an atmosphere of nitrogen a performance ($SOZ_{N2}$) can be adjusted at almost all through speeds which corresponds at the most to 50% of the performance ($SOZ_{Air}$) necessary under cooling air, which is important for the rapid curing without damage of printed, temperature-sensitive plastic sheets.

The inflow surface of the jet for nitrogen was 0.2 mm×300 mm in the present instance.

In order not to have to consider the thermal sensitivity of plastic sheets, the test was carried out on aluminum sheets b=260 mm, d=20 μm which had been preprinted with Ascepte Extra Black, a black, UV-curing acrylate ink with several Norrish I photoinitiators with the surface covered. Compressed air and nitrogen were blown at a preliminary pressure of 6 bar via an air sword at the input of a chamber constructed analogously to FIG. 2 with two LED lamps offset in series as an air curtain or nitrogen curtain at an angle of 45° in the transport direction onto the printed surface of the sheet passing through, as a result of which, in combination with a suction removal, an excess pressure of 0.1-20 mbar was adjusted in the chamber. The diameter of the cooling cylinder was 84 mm, width 380 mm and the irradiated circumference has a length in the transport direction of ca. 122 mm at a looping angle of ca. 167°. Basically, quite differently dimensioned cooling rollers are possible for such a use; however, cooling rollers with a diameter of 60 mm to 200 mm are advantageous based on the sheet thickness and the inertia forces which can still be readily controlled up to 200 mm. As regards the roller width, it is normally in accordance with the widest printing web to be printed. Refer for the rest to the above indications. A cotton rod (Q-tips) was pressed on and drawn over the printed surface directly after having passed the curing chamber, wherein the SOZ-UV performance was determined as the lowest performance at which no more color was transferred onto the small cotton rod. The performance was increased in Watt steps of 1.6 Watt/cm², if necessary up to the maximum value of 16 Watts/cm².

TABLE 1

| $V_{web}$ | [m/min] | 10 | 20 | 30 | 40 | 50 | 60 |
|---|---|---|---|---|---|---|---|
| $SOZ_{Air}$ | [W/cm²] | 4.8 | 5.0 | 8.0 | 9.6 | 11.2 | >16 |
| $SOZ_{N2}$ | [W/cm²] | <1.6 | <1.6 | 3.2 | 4.8 | 6.4 | 8.7 |

Analogous tests were also carried out with Ar and Ne as inert gases. The SOZ-UV performance was also able to be distinctly lowered with this compared to an air cooling; however, not quite to the same extent as with nitrogen.

Even though the present invention was described as above using different embodiments with partially different features, it is noted here that even other combinations which are not cited here, in particular embodiments with features which were cited only in conjunction with another embodiment, are also considered as being disclosed in accordance with the invention in as far as such a combination was not recognized at the start as illogical to a person skilled in the art.

LIST OF REFERENCE NUMERALS

1, 1' curing chamber
2 $2^{nd}$ chamber wall
3, 3' IG outlet, air sword in/as the $3^d$ chamber wall
3'' $3^d$ chamber wall
4, 4' IG outlet, air sword in/as the $4^{th}$ chamber wall
5 cooling surface, $1^{st}$ chamber wall
5' cooling roller
5'' cooling roller axis
6 side surface, section of the side surface of the $5^{th}/6^{th}$ chamber wall
7 guide means, upper/lower guide surface for printing product
8 contact pressure means, contact pressure roller for printing product
9 printing product
10 printed surface of the printing product
11 LED lamp, LED array
11' LED lamp, LED irradiator
12, 12', 12'' jet
12''' inlet surface
13, 13', 13'' IG outlet opening
14 IG supply line
15 IG removal line
16, 16' flow guidance means in IG inlet
17 oxygen probe
18 dynamic seal, e.g. labyrinth, brush
19 static seal
20 compressor
21 inlet slot
22 outlet slot
23 printer
24 printing device
25 printing web 26 thickness measuring of the printing web
27 inlet dancer rollers
28 splicing table (inlet)
29 printing web guide
30 printing web cleaning station (opt.)
31 corona station (opt.)
32 printing web heating (opt.)
33 label edge &/or printing position sensor
34 printing device
35, 35' inkjet printing head
36 fixing station
37 optical testing device (opt.)
38 outlet dancer rollers
39 splicing table (outlet)
40 printing product guide
41 winding-up traction control00
42 printing product rol0
43 inlet/outlet uni0
44 frame
45 frame foot

The invention claimed is:

1. A curing chamber for curing and drying a flat printed product printed with at least one UV-curing pigment, comprising
   a first chamber wall which comprises a cooling surface or is a cooling surface,
   a second chamber wall which is opposite the first chamber wall, wherein at least one UV lamp directed onto the cooling surface is arranged on or in the second chamber wall,
   third and fourth chamber walls which are arranged opposite one another between the first and the second chamber walls and which each comprise an introductory slot or removal slot and/or form an appropriate slot to the first chamber wall,
   fifth and sixth side walls arranged opposite one another and arranged between the first and the second chamber walls,
wherein a gas inlet or a gas outlet is arranged on or in the vicinity of the third and fourth chamber walls, wherein the gas inlet is an inert gas inlet.

2. The curing chamber according to claim 1, characterized in that the gas inlet is placed on or in the vicinity of a chamber boundary which is opposite a direction of transport like the gas outlet.

3. The curing chamber according to claim 1, characterized in that the inert gas supply comprises or is at least one Ar, Ne, He and/or Xe, $CO_2$ but especially a nitrogen supply ($N_2$).

4. The curing chamber according to claim 1, characterized in that the gas inlet is placed on or in the vicinity of a front chamber wall relative to a transport direction (T).

5. The curing chamber according to claim 1, characterized in that the cooling surface is the surface of a rotatable cooling roller.

6. The curing chamber according to claim 1, characterized in that the gas inlet comprises at least one flat jet or an appropriate linear jet arrangement with an alignment to the transport plane which is parallel to the longitudinal dimension of the jet opening or jet arrangement, and with an outlet plane (IG) of the inert gas which is directed parallel to or at an acute angle to the transport plane, in particular to the cooling surface.

7. The curing chamber according to claim 1, characterized in that the UV lamp emits light in a range between 200 nm and 450 nm or between 365 nm and 405 nm.

8. The curing chamber according to claim 1, characterized in that the UV lamp is arranged parallel to the cooling surface and at a distance of 5 mm to 50 mm, or of 10 mm to 40 mm.

9. The curing chamber according to claim 1, characterized in that the curing chamber comprises two or more UV lamps which are arranged offset with respect to the transport direction and/or staggered from one another laterally.

10. The curing chamber according to claim 1, characterized in that the UV lamp comprises or is an LED lamp or an LED array.

11. The curing chamber according to claim 1, characterized in that the curing chamber comprises means for pressing the printed product onto the cooling surface and/or means for guiding the printed product on the cooling surface.

12. A printer with at least one printing device for applying a UV-curing ink to a printing web, said printing device having at least one UV ink reservoir or a UV ink supply, characterized in that said printer comprises a curing chamber according to claim 1 which is arranged downstream from the printing device.

13. The printer according to claim 12, characterized in that it comprises means for pressing the printed product onto the cooling surface.

14. The printer according to claim 12, characterized in that the pressing means comprises at least one spring-loaded roller.

15. The printer according to claim 13, characterized in that the printing device comprises at least one inkjet printing head.

16. The printer according to claim 15, characterized in that the printing device comprises two, three, four or more inkjet printing heads with a different ink.

17. The printer according to claim 16, characterized in that a fixing station is arranged between at least two printing heads with different inks and/or between the last printing head and the curing chamber.

18. The printer according to claim 13, characterized in that the printer comprises a supply roll for receiving a printing material web and/or comprises a receiving roll for receiving the printed product.

19. The printer according to claim 13, characterized in that the printer is designed as a module of an in-line printing system with a continuous printing web.

20. A method for printing a printing material web wherein the printing material web is first printed in a printing device with a UV-curing ink and is subsequently cured in a curing chamber according to claim 1 under inert gas.

21. The method according to claim 20, characterized in that the inert gas is Ar or also Ne, He, Xe or $CO_2$, but in particular nitrogen.

22. The method according to claim 20, characterized in that the method is carried out in a printer with at least one printing device for applying a UV-curing ink to a printing web, said printing device having at least one UV ink reservoir or a UV ink supply, characterized in that said printer comprises a curing chamber, characterized in that it comprises means for pressing the printed product onto the cooling surface, characterized in that the pressing means comprises at least one spring-loaded roller, characterized in that the printing device comprises at least one inkjet printing head, characterized in that the printing device comprises two, three, four or more inkjet printing heads with a different ink, characterized in that a fixing station is arranged between at least two printing heads with different inks and/or between the last printing head and the curing chamber, characterized in that the printer comprises a supply roll for receiving a printing material web and/or comprises a receiving roll for receiving the printed product, and characterized in that the printer is designed as a module of an in-line printing system with a continuous printing web.

23. The method according to claim 20, characterized in that the method is an endless printing method and that the printed product is printed at a through speed of 5 to 300 m/min or 7 to 60 m/min and is cured.

24. The method according to claim 23, characterized in that a power of 1 to 40 W/cm$^2$, or between 2 to 20 W/cm$^2$ is introduced onto the surface of the printed product guided onto or on the cooling surface.

25. The method according to claim 20, characterized in that the printing material web comprises a film or an endless film.

26. The method according to claim 25, characterized in that the film is a plastic film, a paper-based film, a label film or an aluminum foil.

27. The method according to claim 25, characterized in that the film or endless film has a thickness of 0.5 μm to 600 μm, in particular between 10 μm to 300 μm.

28. The method according to claim 20, characterized in that the UV-curing ink comprises an acrylate base with a content of pigment(s) and/or clear lacquer, radical photoinitiators, dispersant(s) and optionally other additives, wherein at least two radical photoinitiators of the Norrish type 1 and at least one radically curable monomer in the form of a polyfunctional alkoxylated and/or polyalkoxylated acrylate monomer comprising one or more di- and/or triacrylates are contained, wherein the molar ratio of all acrylates to all initiators is about 5:1 to 19:1, especially about 7:1 to 15:1.

29. The method according to claim 28, characterized in that the UV-curing ink contains an adhesion promotor in the form of an isocyanate in a concentration of 0.1 wt % to 20 wt % or 0.5 wt % to 2.5 wt %.

* * * * *